United States Patent

Krieder et al.

[11] Patent Number: 5,592,754
[45] Date of Patent: Jan. 14, 1997

[54] ELECTRONIC CONTROL OF COMPRESSOR UNLOADER AND AIR DRYER PURGE

[75] Inventors: Robert D. Krieder, Sullivan; Cheryl L. Greenly, Elyria, both of Ohio

[73] Assignee: AlliedSignal Truck Brake Systems Co., Elyria, Ohio

[21] Appl. No.: 660,521

[22] Filed: Jun. 7, 1996

[51] Int. Cl.$^6$ .................. F04B 41/02; F04B 39/06
[52] U.S. Cl. .................. 34/527; 34/80; 96/114
[58] Field of Search .................. 34/549, 562, 527, 34/531, 558, 60, 61, 78, 79, 80; 95/22; 96/114; 55/271, DIG. 34

[56] References Cited

U.S. PATENT DOCUMENTS

| | | | |
|---|---|---|---|
| 3,696,588 | 10/1972 | Dussourd et al. | 55/163 |
| 3,937,622 | 2/1976 | Hewitt et al. | 55/163 |
| 4,546,442 | 10/1985 | Tinker | 364/500 |
| 4,763,959 | 8/1988 | Vandemotter | 303/9 |
| 4,892,569 | 1/1990 | Kojima | 55/163 |
| 4,900,098 | 2/1990 | Kuhn et al. | 303/1 |
| 4,936,026 | 6/1990 | Cramer et al. | 34/53 |
| 5,027,529 | 7/1991 | Cramer et al. | 34/53 |
| 5,103,576 | 4/1992 | Cramer et al. | 34/46 |
| 5,145,495 | 9/1992 | Elamin | 55/162 |
| 5,458,676 | 10/1995 | Herbst et al. | 96/109 |

*Primary Examiner*—John M. Sollecito
*Assistant Examiner*—Steve Gravini
*Attorney, Agent, or Firm*—Howard G. Massung

[57] ABSTRACT

An electronically controlled compressed air system (10) includes an air dryer (16) which dries compressed air before the compressed air is communicated to a reservoir (26). The air dryer (16) includes a desiccant (18) which is purged by using air stored in the reservoir (26). A pressure transducer (13) is installed on the reservoir (26) and transits an electrical signal, indicative of the pressure in the reservoir (26) to an electric controller (11). Electric controller (11) transmits signals at various selected pressure levels to solenoid value (28) to control loading and unloading of the compressor (12), to solenoid valve (36) to control purging of the air dryer (16), and to the warning light (40) to alert an operator of a low air pressure condition. The valve (36) is operated to permit purging only when the compressor (12) is unloaded and only until a reservoir pressure is reached which is a predetermined pressure drop below the reference pressure level at which the compressor (12) is unloaded, whereupon purging is terminated.

6 Claims, 2 Drawing Sheets

ELECTRONIC CONTROL OF COMPRESSOR UNLOADER AND AIR DRYER PURGE

BACKGROUND OF THE INVENTION

1. Field of the Invention

This invention relates to a system for controlling the charging and purging cycles of a compressor and an air dryer used in a compressed air system.

2. Description of prior Art

Compressed air systems are commonly used to operate the brakes of heavy duty vehicles, and operate other vehicle accessories (such as fan clutches). Compressed air systems also may be used with industrial machines. Compressed air systems commonly include an air dryer containing a desiccant material which removes the moisture contained in the compressed air before the compressed air is stored in a reservoir. The desiccant used in air dryers must be periodically purged of its moisture by backflowing a quantity of compressed air through the desiccant and discharging the air to atmosphere. Prior art air dryers commonly included an integral purge volume within the air dryer housing in which a quantity of compressed air was kept segregated for use in purging. Of course, the integral purge volume substantially increases the size of the air dryer, thereby making installation on some vehicles difficult. Alternatively, some air dryers use a remote mounted purge volume, in which a canister separate from the system reservoirs is mounted remote from the air dryer and is connected thereto by a separate air line. A remote purge volume substantially increases system cost, because of the cost of the added component, and also because the remote purge volume makes installation of the air dryer on a vehicle more complex and time consuming.

In general, the air stored in the reservoir is not used for purging, because the purge control valve on air dryers is open to atmosphere for a substantial time period, which would cause the pressure level in the reservoir to be depleted to an unacceptable level. Although it has been proposed that pneumatic and/or electrical timers be used to limit the amount of air taken from a storage reservoir during purging, each of these proposed devices has practical difficulties. Limiting the length of time that air is taken from a reservoir is generally not a satisfactory solution to the problem because the amount of compressed air passing through the system during a purge cycle of a given period of time varies depending on several factors, including the reservoir volume, the pressure level to which the reservoir was initially charged (which may vary substantially), and the size of the orifice through which the purge air is communicated when the desiccant is purged.

SUMMARY OF THE INVENTION

The present invention utilizes a pressure transducer which communicates with a compressed air storage reservoir and which monitors the pressure level in the reservoir and through an electronic controller limits the pressure drop in the reservoir during the purge cycle to a predetermined pressure level. The pressure transducer provides a signal to the electronic controller which provides electrical outputs to control a low pressure warning lamp, a compressor unloader solenoid and an air dryer purge solenoid. Accordingly, the prior art integral purge volume and remote purge volumes are eliminated, thereby reducing the size of the air dryer and facilitating its installation, and the difficulty inherent in timing the purge cycle is avoided.

BRIEF DESCRIPTION OF DRAWINGS

For a better understanding of the invention reference may be had to the preferred embodiments exemplary of the inventions shown in the accompanying drawings in which.

DETAILED DESCRIPTION OF THE PREFERRED EMBODIMENTS

Figure 1:
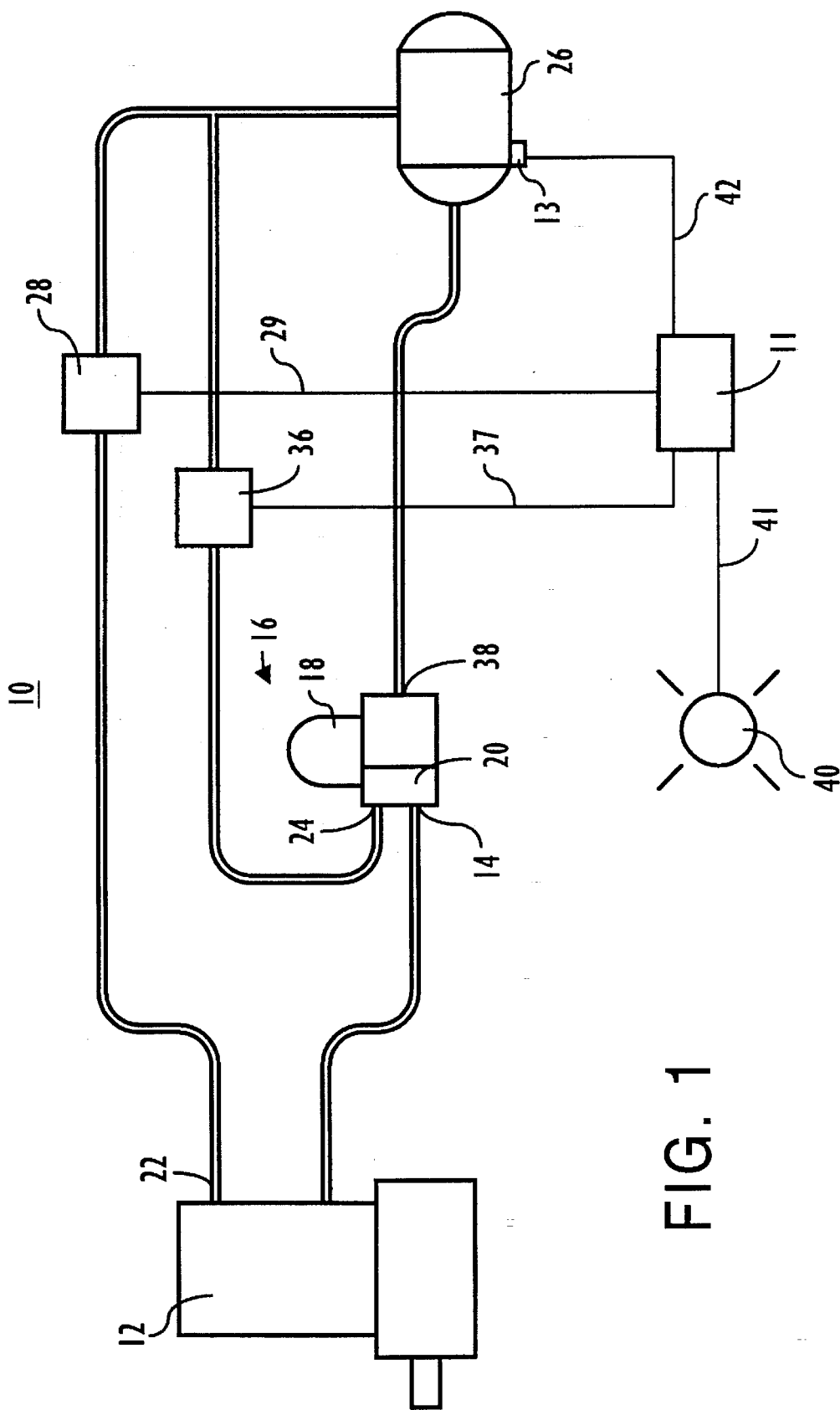
FIG. 1 is a diagrammatic illustration of a compressed air system using the pressure differential electronic controller according to the present invention; and, FIG. 2 is a block diagram of a differential electronic controller according to the present invention.

Referring now to the drawings and FIG. 1 in particular there is shown an improved compressed air control system 10 for electronically controlling the loading and unloading of an air compressor 12 and purging of an air dryer 16, according to the teaching of the present invention. The compressed air system generally indicated by the numeral 10 includes an air compressor 12, which is powered by, for example, the engine of a motor vehicle. The outlet of the air compressor 12 is connected to an inlet port 14 of the air dryer generally indicated by the numeral 16, which includes a desiccant canister or bed 18. Air dryer 16 includes an integral inlet and purge control valve generally indicated by the numeral 20. The valve 20 responds to a pressure signal utilizing compressed air from reservoir 26 and which is transmitted to control port 24 of the air dryer 16 through a purge control solenoid valve 36. When a signal is received at the control port 24, the conventional combination inlet and purge control valve 20 closes off the inlet port 14 and opens the desiccant bed 18 to atmosphere, thereby initiating purging.

The pressure signal is transmitted to control port 24 in response to pressure in reservoir 26 attaining a predetermined level, such as 120 psi. Compressor 12 includes an internal unloading mechanism which disables or unloads the compressor 12, normally by holding open the inlet valves of the compressor 12, in response to a signal applied to a compressor load/unload port 22. The pneumatic pressure control signal to load/unload port 22 is supplied through a compressor control solenoid valve 28. The load/unload port 22 controlled by solenoid valve 28, activates an internal load/unload mechanism which enables or loads the compressor 12 when the pressure in reservoir 26 drops to a selected cut-in pressure level, such as 100 psi which is lower than the predetermined cut-out pressure level of 120 psi.

A pressure transducer 13 is connected to sense the pressure in reservoir 26 and to provide an electrical output signal which is indicative of the pressure in reservoir 26. The pressure transducer 13 provides an output signal along a line 42 to an electronic controller 11. The purpose of the electronic controller 11 is to utilize the electrical signal from transducer 13 to control three different outputs; a low pressure warning lamp 40, the compressor control solenoid 28 and the purge control solenoid 36. The electronic controller 11 can effectively combine these three operations and eliminate the need for separate mechanical units. Controller 11 provides a control signal along line 29 to control operation of the compressor control solenoid 28 for loading and unloading compressor 12. Controller 11 provides an electrical signal along line 37 to control operation of solenoid 36 for letting a pneumatic signal flow to the pneumatic purge control valve 20 which is integral with air dryer 16 to initiate and end a purge cycle. Controller 11 also provides a signal along line 41 to activate lamp 40 when the pressure in reservoir is considered too low for emergency stopping. In explaining this invention transducer 13, controller 11, and solenoids 28 and 36 are shown as separate components. It should be understood that they may be combined into an integral assembly.

Figure 2:
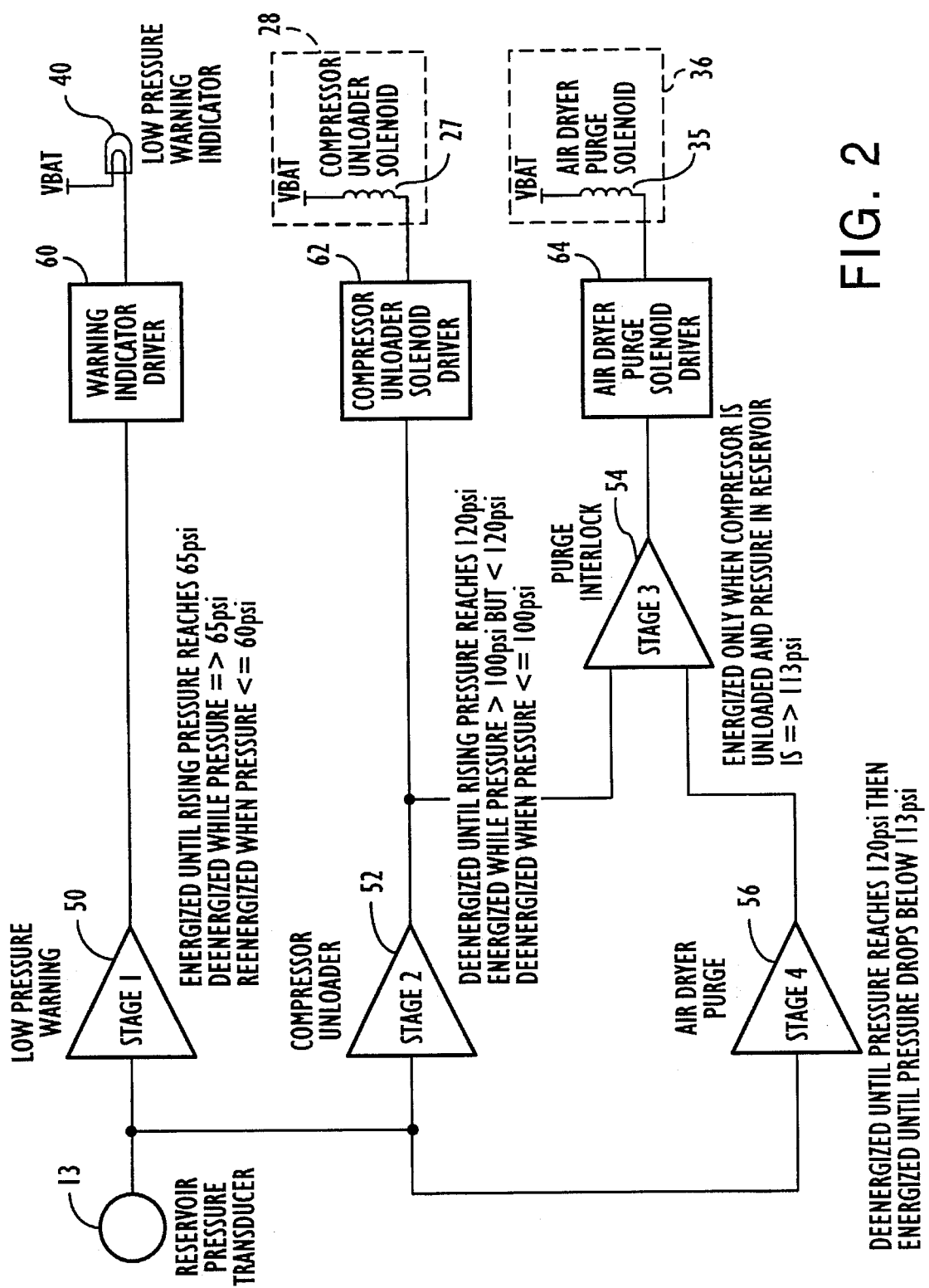

The operation of the electronic controller can be better understood by referring to the block diagram of controller 11 shown in FIG. 2. The electronic controller 11 employs a quad comparator, consisting of comparators 50, 52, 54 and 56 to provide the control signals for the solenoids 27, 35 and lamp 40 through drivers 60, 62 and 64. The pressure transducer output voltage is compared by each comparator 50, 52 and 56 to its selected point voltage. The output of each comparator 50, 52, 54, and 56 will switch HIGH (approximately supply voltage) when the input to its positive node is more positive than the input to its negative node. Each comparator 50, 52, 54, and 56 will switch LOW (approximately 0.2 volts) when the opposite is true. In the present case, each comparator 50, 52, 54 and 56 will switch states at different voltage levels due to programmable hysteresis. The voltage value that will cause the comparators 50, 52, 54, and 56 to switch states can be accurately calculated and selected. When the output of the comparator 50, 52 or 54 is HIGH, the drivers 60, 62 or 64 will begin operating, causing current to flow through the lamp 40 or either solenoid 27 or 35. The switch points for the comparators 50, 52 and 54 can be set to conform to different requirements. In the present system, the low pressure warning lamp 40 goes off at 65 psi on rising pressure and comes on at 60 psi on falling pressure; the internal compressor load/unload mechanism in response to a signal applied to port 22 unloads or cuts out the compressor 12 at 120 psi on rising pressure and loads or cuts in the compressor 12 at 100 psi on descending pressure; and, the air dryer purge valve 20 starts the purge cycle at 120 psi on rising pressure and stops the purge cycle at 113 psi on falling pressure.

The purpose of the Low Pressure Warning Lamp 40 is to inform the operator of the vehicle that the reservoir 26 pressure is below 60 psi. The lamp 40 will be on from power up until the reservoir 26 pressure reaches 65 psi and the will be off until the reservoir 26 pressure goes below 60 psi. The warning lamp 40 will be located on the dashboard of the vehicle.

While specific pressure levels are used in describing this invention, the pressure levels, at which various events occur, can easily be reset or changed. The U.S. Department of Transportation Federal Motor Vehicle Safety Standards for Air Brake Systems specifies various pressure levels which must be maintained.

The purpose of the compressor unloader elements, comparator 52, solenoid driver 62 and solenoid coil 27, is to control solenoid valve 28 to provide a pneumatic signal to the load/unload port 22 on compressor 12 to control the delivery of compressed air to the reservoir 26. Solenoid valve 28 will be normally closed, which means that in the deenergized state, the compressor 12 will be loaded and compressed air will be delivered to the reservoir 26. If the solenoid valve 28 or the electronic controller 11 were to fail, the compressor 12 would continue to provide compressed air to the reservoir 26. Solenoid valve 28 will be deenergized until the reservoir 26 pressure reaches 120 psi and then will be energized until the reservoir 26 pressure goes below the cut in pressure of 100 psi, which will restart or load the compressor 12.

The purpose of the air dryer purge stage consisting of comparators 54, 56 solenoid driver 64 and solenoid coil 35 is to control solenoid valve 36 to provide a pneumatic signal to the purge port 20 of air dryer 16. The air dryer purge is necessary to remove all water and contaminants from the desiccant 18 inside the air dryer 16. The system is designed to be used with air dryers that do not have an integral purge volume, but can also be adapted to control other types of air dryers. The purge cycle will begin when the reservoir 26 pressure reaches 120 psi and will continue until the reservoir 26 pressure falls to 113 psi. The reservoir pressure change occurs because the air dryer 16 depletes the reservoir 26 air supply for its purge cycle. This purge control, based on pressure differentials, responds to the amount of reservoir 26 air used in the purge cycle whereas the volume of reservoir 26 air used in a timed purge cycle will vary according to the capacity of the main reservoir 26. Comparator 54 is used to prevent the air dryer purge cycle from activating before the compressor 12 unloads. Without this interlock, the air dryer purge cycle would continually deplete the reservoir and the compressor unloader signal would never occur. The air dryer purge solenoid valve can be located inside the air dryer 16. While a specific analog construction was used to describe this embodiment it is to be understood that various other analog or digital circuits could easily be constructed for practicing this invention. To change the pressure set points with the analog version different component values must be used.

In the air compressor control system 10, the purge cycle is started only after compressor 12 is unloaded when the pressure in reservoir 26 reaches 120 psi and stays on until the pressure in reservoir 26 drops to a set level such as 113 psi, which is greater than the cut in pressure of 100 psi which causes the compressor 26 to load. The purge cycle is not timed and turns on and off only in response to set pressure levels in reservoir 26. The warning light 40 is illuminated when the pressure in reservoir 26 falls below a dangerously low level such as 60 psi, which is too low for some emergency braking situations.

We claim:

1. A compressed air system comprising:

a reservoir for storing compressed air;

an air compressor capable of supplying compressed air to said reservoir and being operable in a loaded condition wherein compressed air is supplied to said reservoir and an unloaded condition wherein compressed air is not supplied to said reservoir and including compressor control means responsive to an input signal to switch said air compressor between the loaded condition and the unloaded condition;

a pressure sensor connected to sense the pressure in said reservoir and providing an output signal which is indicative of the sensed pressure;

an air dryer connected between said air compressor and said reservoir and including a desiccant bed for removing moisture from the compressed air and a vent to atmosphere for purging said desiccant bed;

purge control means connected to said air dryer and responsive to an input signal to purge said air dryer by venting said desiccant bed through the vent to atmosphere whereby compressed air flows back from said reservoir through said air dryer and said vent to purge said desiccant bed;

compressor comparator means connected to received an input from said pressure sensor and providing an output signal to said compressor control means for switching said compressor to an unloaded condition when the pressure in said reservoir exceeds a first set value and for switching said compressor to a loaded condition when the pressure in said reservoir falls below a second set value; and, air dryer purge comparator means connected to receive an input signal from said pressure sensor for providing a signal to said purge control means to purge said air dryer when said air compressor is in an unloaded condition and the pressure in said reservoir is above a third set value which is intermediate the first set value and the second set value.

2. A compressed air system as claimed in claim 1 comprising:

a warning lamp which when activated warns an operator of a low pressure;

low pressure comparator means connected to receive an input from said pressure sensor and providing an output to said warning lamp when the pressure in said reservoir falls below a fourth set value, which is lower than the second set value, to activate the warning lamp.

3. An air compressor system comprising:

a reservoir an air compressor connected to supply compressed air to said reservoir when loaded and to not supply compressed air when unloaded;

a pressure transducer connected to be responsive to the pressure in said reservoir and providing an electrical output signal indicative of the reservoir pressure;

an air dryer connected between said reservoir and said air compressor including a desiccant for removing moisture and also including a purge control valve which when activated vents the desiccant bed to initiate purging;

compressor control means connected to receive the electric signal from said pressure transducer for unloading said air compressor when the reservoir pressure exceeds a first pressure and for loading the air compressor when the pressure in said reservoir falls below a second pressure;

purge control means connected to receive the electric output signal from said pressure transducer for causing purging of said air dryer when said air compressor is unloaded and the pressure in said reservoir is above a third pressure, which is intermediate the first pressure and the second pressure, and for stopping purging of said air dryer when the pressure in said reservoir falls below the third pressure.

4. An air compressor system as claimed in claim 3 comprising:

a low pressure warning light;

low pressure warning means connected to receive the electric signal from said pressure transducer and activating said low pressure warning light when the pressure in said reservoir falls below a fourth pressure which is lower than the second pressure.

5. An air compressor system having a compressor, which is loaded and unloaded in response to a pneumatic signal, for supplying compressed air to a reservoir through an air dryer, which includes a purge means responsive to a pneumatic signal for purging the air dryer to atmosphere and which also includes a desiccant bed, the improvement comprising:

a compressor control solenoid valve disposed in a pneumatic connection between the compressor and the reservoir to provide the pneumatic signal to load or unload the compressor;

an air dryer purge solenoid valve disposed in a pneumatic connection between the air dryer and the reservoir to provide a pneumatic signal to said purge means;

a pressure transducer mounted to sense the pressure in the reservoir and provide an output electrical signal indicative of the pressure in the reservoir;

controller means for receiving the output electrical signal from said pressure transducer and for providing a first electrical output to said compressor control solenoid valve to unload the compressor when a first pressure is reached and to load the compressor when the reservoir pressure falls below a second pressure and a second electrical output to said air dryer purge solenoid valve to cause purging of the air dryer when the air compressor is unloaded and pressure in the reservoir is above the second pressure.

6. An air compressor system as claimed in claim 5 wherein said controller means also provides a third electrical output to light a warning lamp when the reservoir pressure falls below a set pressure which is less than the second pressure.

* * * * *